US012812235B2

(12) United States Patent
Kageyama et al.

(10) Patent No.: US 12,812,235 B2
(45) Date of Patent: Nov. 24, 2026

(54) IMAGING APPARATUS, INFORMATION PROCESSING METHOD, AND STORAGE MEDIUM

(71) Applicant: CANON KABUSHIKI KAISHA, Tokyo (JP)

(72) Inventors: Yuichi Kageyama, Kanagawa (JP); Tomoaki Kawai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/221,622

(22) Filed: May 29, 2025

(65) Prior Publication Data

US 2025/0373928 A1 Dec. 4, 2025

(30) Foreign Application Priority Data

May 31, 2024 (JP) ................................ 2024-089244

(51) Int. Cl.
*H04N 23/611* (2023.01)
*G06F 21/32* (2013.01)
(Continued)

(52) U.S. Cl.
CPC ........... *H04N 23/611* (2023.01); *G06F 21/32* (2013.01); *H04N 5/9201* (2013.01)

(58) Field of Classification Search
CPC .... H04N 23/611; H04N 1/2116; H04N 23/61; H04N 23/64; H04N 23/62; H04N 1/2112;
(Continued)

(56) References Cited

U.S. PATENT DOCUMENTS

2001/0022621 A1* 9/2001 Squibbs ............... G11B 27/105
386/E5.072
2023/0142023 A1* 5/2023 Shinomiya ............ G06F 21/105
726/28

FOREIGN PATENT DOCUMENTS

JP 2002218389 A 8/2002
JP 2004171528 A 6/2004
(Continued)

OTHER PUBLICATIONS

Extended European Search Report issued by the European Patent Office on Sep. 16, 2025 in corresponding EP Patent Application No. 25179794.0.

*Primary Examiner* — Lin Ye
*Assistant Examiner* — Steven Daniel Barry
(74) *Attorney, Agent, or Firm* — Carter, DeLuca & Farrell LLP

(57) ABSTRACT

An obtaining unit obtains authentication information. A specification unit specifies a user of the imaging apparatus based on the authentication information. A setting unit sets a first usage condition. A first control unit performs control such that, in a case where the imaging apparatus performs imaging in a state where a user is specified, an imaged image obtained by the imaging and information on the user are recorded in association with each other, and performs control such that, in a case where the imaging apparatus performs imaging in a state where a user is not specified and in a state where the first usage condition is satisfied, the imaged image obtained by the imaging and information on a user corresponding to the first usage condition are recorded in association with each other.

13 Claims, 8 Drawing Sheets

(51) Int. Cl.
*H04N 5/92* (2006.01)
*G06F 21/33* (2013.01)
*H04N 1/44* (2006.01)
*H04N 23/61* (2023.01)
*H04N 23/62* (2023.01)

(58) Field of Classification Search
CPC .. H04N 1/32128; H04N 1/32144; H04N 1/44; H04N 1/442; H04N 1/4446; H04N 5/9201; H04N 2201/3233; H04N 2201/3274; H04N 2201/3276; H04N 2201/3277; G06F 21/32; G06F 21/33
See application file for complete search history.

(56) References Cited

FOREIGN PATENT DOCUMENTS

| | | | | |
|---|---|---|---|---|
| JP | 2007065897 | A | * | 3/2007 |
| JP | 2013140601 | A | | 7/2013 |
| JP | 2013239925 | A | | 11/2013 |
| JP | 2014212404 | A | | 11/2014 |
| JP | 2018191194 | A | * | 11/2018 |

* cited by examiner

IMAGING APPARATUS, INFORMATION PROCESSING METHOD, AND STORAGE MEDIUM

BACKGROUND

Field of the Technology

The present disclosure relates to an imaging apparatus, an information processing method, and a storage medium.

Description of the Related Art

In recent years, there has been a demand for a means for specifying and recording a photographer of an image or a video in order to manage a copyright and assure authenticity. Japanese Patent Laid-Open No. 2018-191194 proposes a method of monitoring biological information on a photographer when the photographer is specified and recorded in an image file, determining that the photographer has been replaced if the biological information has changed, and releasing authentication of the photographer.

With the method of Japanese Patent Laid-Open No. 2018-191194, the authentication is released during a series of imaging, and the convenience of imaging may be deteriorated.

SUMMARY

According to one embodiment of the present disclosure, an imaging apparatus comprises: an obtaining unit configured to obtain authentication information; a specification unit configured to specify a user of the imaging apparatus based on the authentication information; a setting unit configured to set a first usage condition of the imaging apparatus; and a first control unit configured to perform control such that, in a case where the imaging apparatus performs imaging in a state where a user is specified by the specification unit, an imaged image obtained by the imaging and information on the user are recorded in association with each other, and perform control such that, in a case where the imaging apparatus performs imaging in a state where a user is not specified by the specification unit and in a state where the first usage condition is satisfied, the imaged image obtained by the imaging and information on a user corresponding to the first usage condition are recorded in association with each other, wherein the first usage condition includes a condition regarding a position of the imaging apparatus, a time at which the imaging apparatus performs imaging, an imaging target of the imaging apparatus, or motion of the imaging apparatus.

According to another embodiment of the present disclosure, an information processing method comprises: obtaining authentication information; specifying a user of the imaging apparatus based on the authentication information; setting a first usage condition of the imaging apparatus; and performing control such that, in a case where the imaging apparatus performs imaging in a state where a user is specified, an imaged image obtained by the imaging and information on the user are recorded in association with each other, and performing control such that, in a case where the imaging apparatus performs imaging in a state where a user is not specified and in a state where the first usage condition is satisfied, the imaged image obtained by the imaging and information on a user corresponding to the first usage condition are recorded in association with each other, wherein the first usage condition includes a condition regarding a position of the imaging apparatus, a time at which the imaging apparatus performs imaging, an imaging target of the imaging apparatus, or motion of the imaging apparatus.

According to yet another embodiment of the present disclosure, a non-transitory computer-readable storage medium is configured to store a computer program comprising instructions for executing following processes: obtaining authentication information; specifying a user of the imaging apparatus based on the authentication information; setting a first usage condition of the imaging apparatus; and performing control such that, in a case where the imaging apparatus performs imaging in a state where a user is specified, an imaged image obtained by the imaging and information on the user are recorded in association with each other, and performing control such that, in a case where the imaging apparatus performs imaging in a state where a user is not specified and in a state where the first usage condition is satisfied, the imaged image obtained by the imaging and information on a user corresponding to the first usage condition are recorded in association with each other, wherein the first usage condition includes a condition regarding a position of the imaging apparatus, a time at which the imaging apparatus performs imaging, an imaging target of the imaging apparatus, or motion of the imaging apparatus.

Features of the present disclosure will become apparent from the following description of embodiments with reference to the attached drawings. The following description of embodiments are described by way of example.

DESCRIPTION OF THE EMBODIMENTS

Figure 1A:
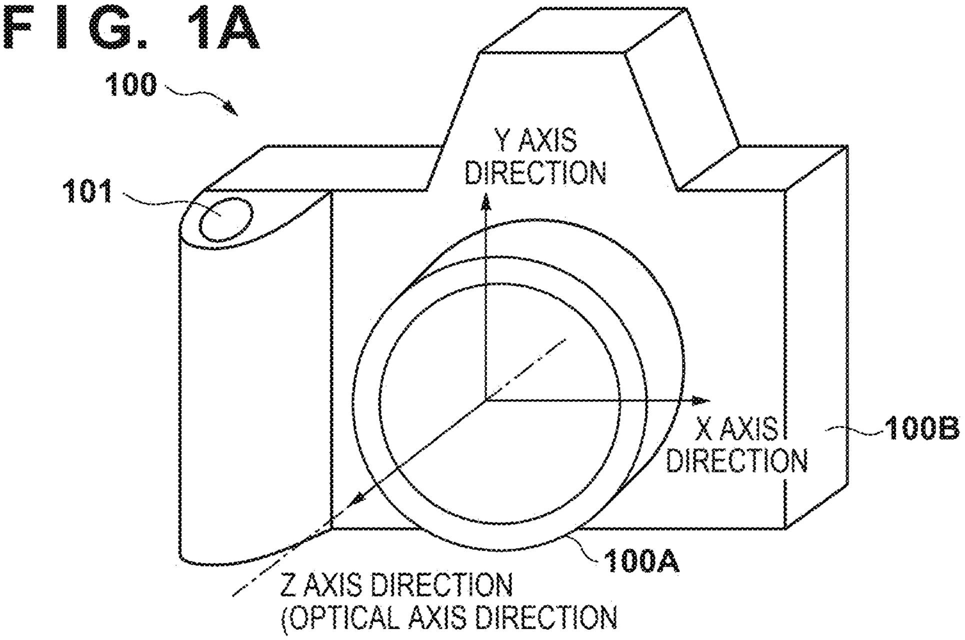
FIG. 1A, FIG. 1B, and FIG. 1C are schematic diagrams illustrating an example of an outer appearance of an imaging apparatus.

Hereinafter, embodiments will be described in detail with reference to the attached drawings. Note, the following embodiments are not intended to limit the scope of the claims. Multiple features are described in the embodiments, but limitation is not made to an disclosure that requires all such features, and multiple such features may be combined as appropriate. Furthermore, in the attached drawings, the same reference numerals are given to the same or similar configurations, and redundant description thereof is omitted.

First Embodiment

Description of Configuration

Figure 1B:
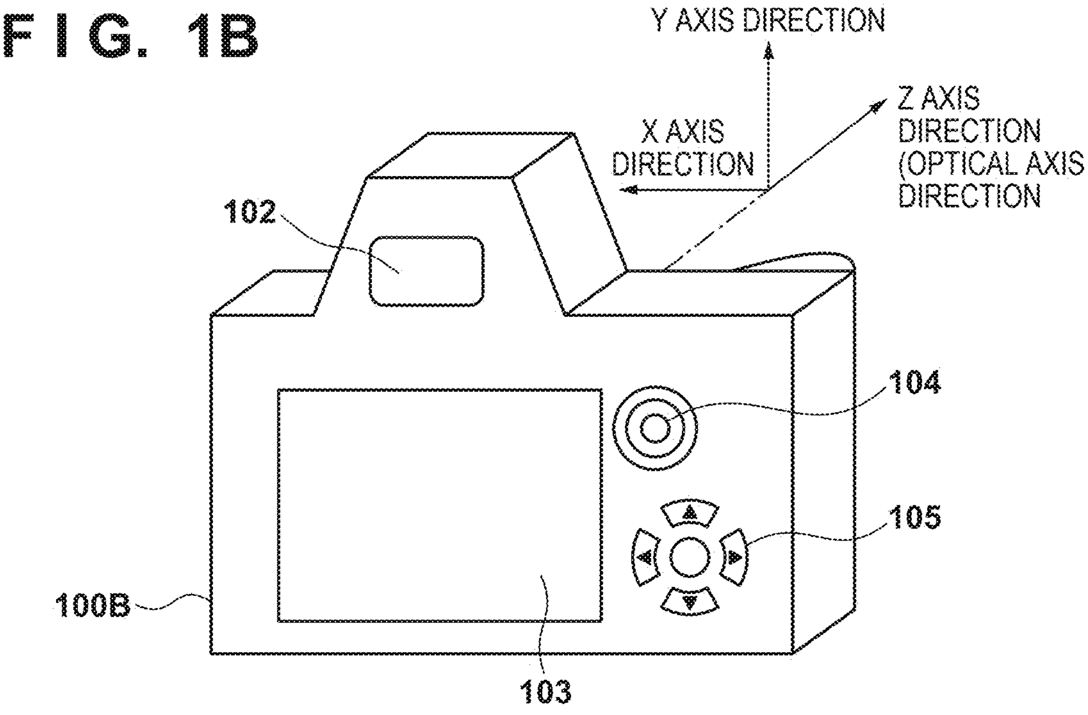

FIGS. 1A and 1B are schematic diagrams illustrating an example of an outer appearance of a camera 100 according to the first embodiment. FIG. 1A is a front perspective view, and FIG. 1B is a rear perspective view. A description will be given on an assumption that the camera 100 according to the present embodiment is an imaging apparatus and is a lens-interchangeable digital still camera, but is not limited to the following configuration as long as it can similarly perform imaging. Hereinafter, a description will be given on an assumption that the camera 100 is meant by simply referring to an "imaging apparatus".

Figure 1C:
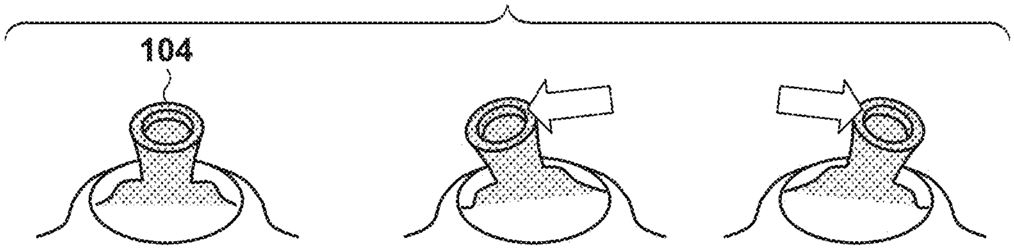

As illustrated in FIG. 1A, the camera 100 includes a lens unit 100A and a camera housing 100B. In the camera housing 100B, a release button 101, which is an operation member that receives an imaging operation from a user (photographer), is disposed. As illustrated in FIG. 1B, an eyepiece lens 102 (finder) into which the user looks to see a display device 214 (display panel) described later included in the camera housing 100B is disposed on the rear surface of the camera housing 100B. Operation members 103 to 105 that receive various operations from the user are also disposed on the rear surface of the camera housing 100B. For example, the operation member 103 is a touch panel that receives a touch operation, the operation member 104 is an operation lever that can be pushed down in each direction, and the operation member 105 is a four-directional key that can be pressed in each of the four directions. FIG. 1C illustrates an example of an input in the operation member 104 according to the present embodiment. Here, for example, by tilting the operation member 104, which is an operation lever, an operation on an operation UI displayed on the operation member 103 may be executed, and control on an imaging mechanism such as zoom magnification or a focus position may be executed. The operation member 103 (touch panel) includes a display panel (e.g., liquid crystal panel), and has a function of displaying an image on the display panel.

Figure 2:
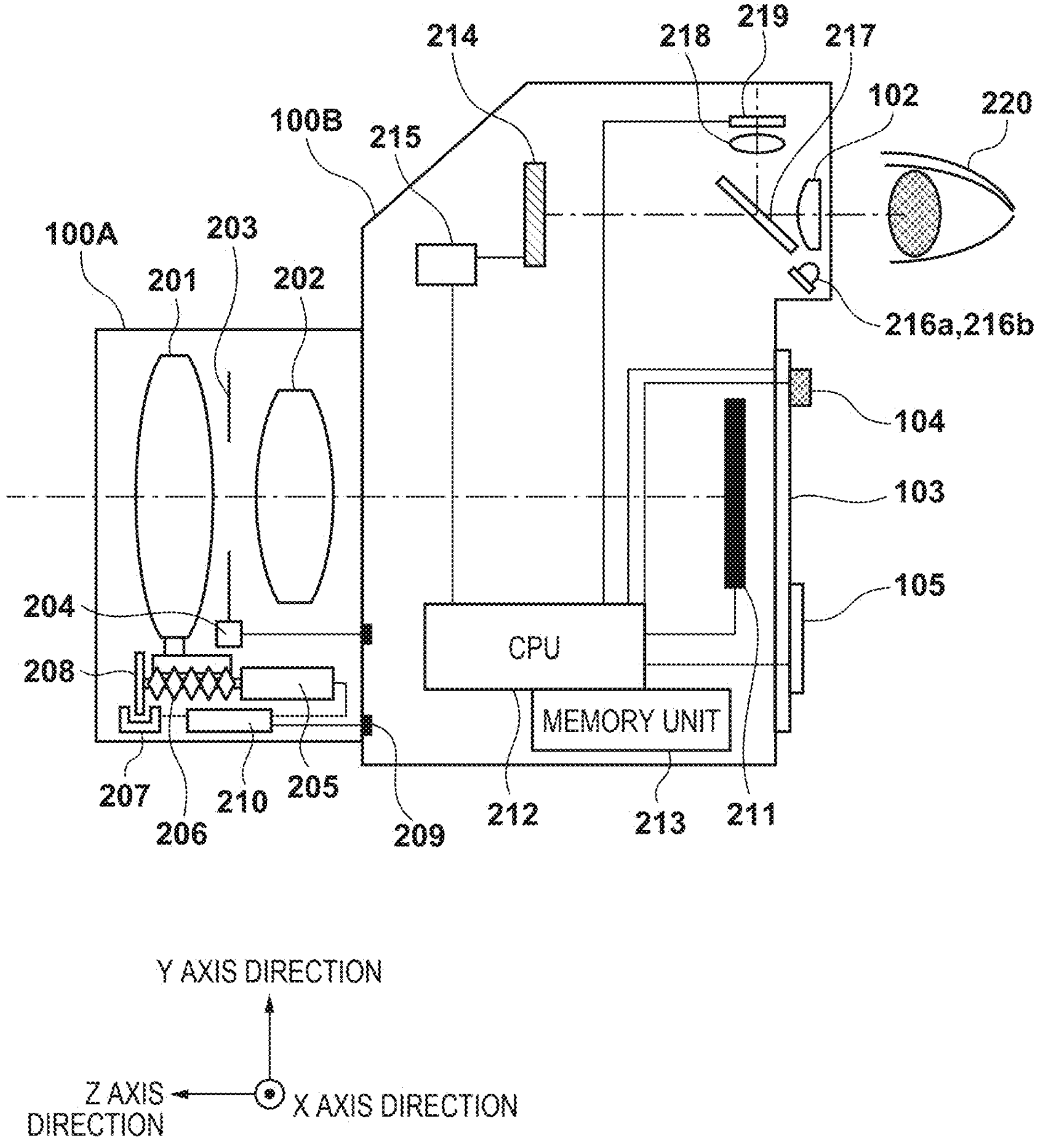
FIG. 2 is a schematic diagram illustrating an example of a cross section of the imaging apparatus.

FIG. 2 is a cross-sectional view of the camera 100 taken along a YZ plane formed by a Y axis and a Z axis illustrated in FIG. 1A, and illustrates an example of a rough internal configuration of the camera 100. The lens unit 100A includes two lenses 201 and 202, an aperture 203, an aperture drive unit 204, a lens drive motor 205, a lens drive member 206, a photocoupler 207, a pulse plate 208, a mount contact 209, and a focus adjustment circuit 210. The lens drive member 206 includes a drive gear. The photocoupler 207 detects and transmits, to the focus adjustment circuit 210, rotation of the pulse plate 208 interlocked with the lens drive member 206. The focus adjustment circuit 210 drives the lens drive motor 205 based on information from the photocoupler 207 and information from the camera housing 100B (information on the lens drive amount), and moves the lens 201 to change the in-focus position. The mount contact 209 is an interface between the lens unit 100A and the camera housing 100B.

Note that although FIG. 2 illustrates the two lenses 201 and 202, this is simplified for description, and the number of lenses included in the lens unit 100A is not limited as described above. The lens unit 100A can include more than two lenses.

The camera housing 100B includes an imaging element 211, a CPU 212, a memory unit 213, the display device 214, and a drive circuit 215. The imaging element 211 is arranged on a planned image forming plane of the lens unit 100A. The CPU 212 is a central processing unit of a microcomputer, and controls the entire camera 100. The memory unit 213 stores various types of information. For example, the memory unit 213 stores an image imaged by the imaging element 211. The display device 214 displays various pieces of information on a screen (display surface) of display device 214. For example, the display device 214 is a liquid crystal panel, and displays an imaged image (subject image) on the screen. The drive circuit 215 drives the display device 214. The user can view the screen of display device 214 through the eyepiece lens 102.

The camera housing 100B also includes light sources 216*a* and 216*b*, an optical separator 217, a light receiving lens 218, and an ocular imaging element 219. The light sources 216*a* and 216*b* are light sources that irradiate the finder (eyepiece lens 102) (an eyeball 220 of the user looking into the eyepiece lens 102) with light. Here, as the light sources 216*a* and 216*b*, a light source used in a known single lens reflex camera for detecting a line of sight from a relationship between a reflected image (cornea reflected image) by cornea reflection of light and a pupil can be used. For example, the light sources 216*a* and 216*b* may be infrared light emitting diodes that emit infrared light insensitive to the user, and may be disposed around the eyepiece lens 102. An optical image of the eyeball 220 that is illuminated is transmitted through the eyepiece lens 102 and reflected by the optical separator 217. Here, an optical image by the reflected light emitted from the light sources 216*a* and 216*b* and reflected by the eyeball 220 is referred to as an "ocular optical image". The ocular optical image is formed by the light receiving lens 218 on the ocular imaging element 219 in which a plurality of photoelectric conversion elements (e.g., CCD or CMOS) are two-dimensionally arranged. The light receiving lens 218 positions the pupil of the eyeball 220 and the ocular imaging element 219 in a conjugate image formation relationship. Therefore, it is possible to detect the line of sight of the eyeball 220 from the position of the cornea reflected image in the ocular optical image formed on the ocular imaging element 219. For example, at least one of information indicating a line-of-sight direction (direction of the line of sight) and information indicating a viewpoint (position at which gaze is directed) on the screen of the display device 214 is obtained as the information regarding the line of sight. This viewpoint may be a position on the screen viewed by the user, or may be a position of the eyeball 220.

Hardware Configuration

Figure 3:
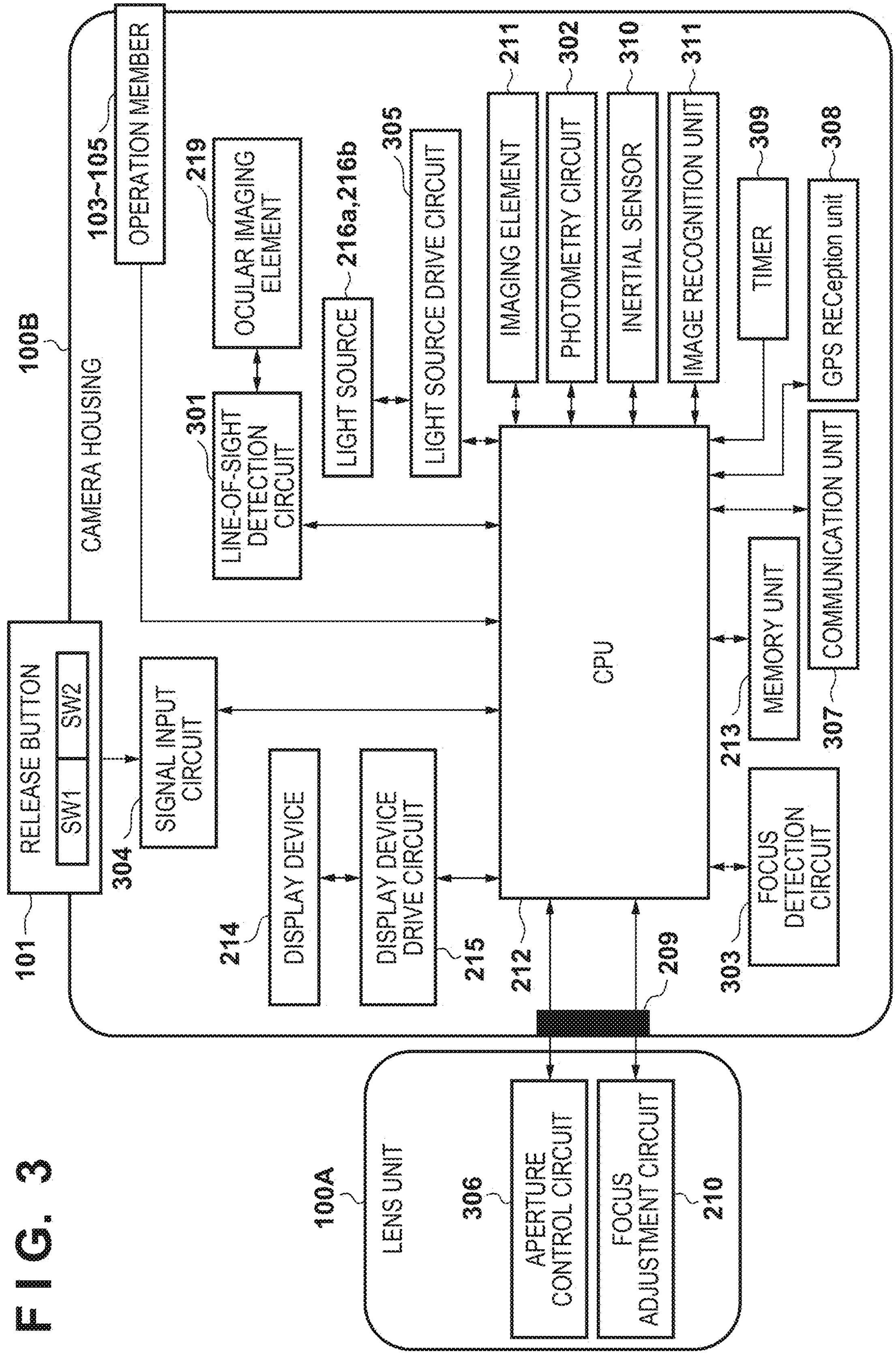
FIG. 3 is a block diagram illustrating an example of a hardware configuration of the imaging apparatus.

FIG. 3 is a block diagram illustrating an example of an electrical configuration (hardware configuration) of the camera 100. The CPU 212 executes various types of control processing in the camera 100. A line-of-sight detection circuit 301, a photometry circuit 302, a focus detection circuit 303, a signal input circuit 304, the drive circuit 215, and a light source drive circuit 305 are connected to the CPU 212 according to the present embodiment. The CPU 212 transmits a signal, via the mount contact 209, to the focus adjustment circuit 210 disposed in the lens unit 100A and the aperture control circuit 306 included in the aperture drive unit 204 in the lens unit 100A. The memory unit 213 added to the CPU 212 stores programs for executing various types of processing, various types of information such as processing results, and the like. The memory unit 213 according to the present embodiment has a storage function of imaging signals from the imaging element 211 and the ocular imaging element 219 and a storage function of parameters regarding the line-of-sight detection.

The line-of-sight detection circuit 301 detects the line of sight of the user based on the imaged image. Here, the output of the ocular imaging element 219 (ocular image obtained by imaging the eye (eyeball 220)) in a state where the ocular optical image is formed on the ocular imaging element 219 is subjected to A/D conversion, and the result is transmitted to the CPU 212. Next, the CPU 212 extracts a feature point necessary for line-of-sight detection from the ocular image, and detects the line of sight of the user from the position of the feature point.

The photometry circuit 302 performs predetermined processing (e.g., amplification, logarithmic compression, and A/D conversion) on a signal obtained from the imaging element 211 also serving as a photometric sensor, for example, a luminance signal corresponding to the brightness of the field, and transmits the result thereof to the CPU 212 as field luminance information.

The focus detection circuit 303 detects a focal position in auto focusing. For example, the focus detection circuit 303 can perform A/D conversion on signals from a plurality of detection elements (plurality of pixels) included in the imaging element 211 and used for phase difference detection, and send the signals to the CPU 212. Next, the CPU 212 calculates the distance to the subject corresponding to each focus detection point from the signals of the plurality of detection elements. This is a known technique known as imaging plane phase difference AF, and any other method may be used for detection of the focal position by the focus detection circuit 303.

A switch SW1 and a switch SW2 are connected to the signal input circuit 304. The switch SW1 is a switch that is turned on by the first stroke of the release button 101. When the switch SW1 is turned on, an ON signal of the switch SW1 is input to the signal input circuit 304 and transmitted to the CPU 212, whereby an imaging preparation operation (e.g., photometry and range finding) of the camera 100 is started. The switch SW2 is a switch that is turned on by the second stroke of the release button 101. When the switch SW2 is turned on, an ON signal of the switch SW2 is input to the signal input circuit 304 and transmitted to the CPU 212, whereby an imaging operation is started. The ON signals from the switches SW1 and SW2 are input to the signal input circuit 304 and transmitted to the CPU 212. Note that this switch group is an example, and the line-of-sight detection may be started, for example, when the switch SW1 is turned on. The light source drive circuit 305 drives the light sources 216*a* and 216*b*.

In the example of FIG. 3, the operation members 103 to 105 are also connected to the CPU 212. When the user operates the operation members 103 to 105, the operation members 103 to 105 output, to the CPU 212, an operation signal corresponding to the operation from the user, and the CPU 212 performs processing (control) corresponding to the operation signal that is input. For example, the CPU 212 may move the position of a frame (item, index) displayed at the viewpoint in response to the operation signal.

In the example of FIG. 3, a communication unit 307, a GPS reception unit 308, a timer 309, an inertial sensor 310, and an image recognition unit 311 are also connected to the CPU 212. The communication unit 307 performs wireless communication with an information device such as a smartphone, a tablet terminal, a smart watch, or a PC owned by the user, and obtains GPS position information on the information device. The wireless communication is assumed to be Wi-Fi (registered trademark), Bluetooth (registered trademark), or the like, but is not limited to this. The GPS reception unit 308 receives a radio wave from a GPS satellite and obtains GPS position information on the camera 100. The timer 309 outputs the current time. The inertial sensor 310 is, for example, an acceleration sensor and an angular velocity sensor, and detects the motion of the camera 100.

The image recognition unit 311 performs recognition processing of an imaged image. For the recognition processing by the image recognition unit 311, a generally used image recognition technique can be arbitrarily used, and for example, image recognition using artificial intelligence or a feature extractor can be performed.

Note that in the following, a description will be given on an assumption that the CPU 212 of the camera 100 controls each processing. However, the present disclosure is not particularly limited to such a configuration as long as the operation of the camera 100 can be similarly controlled. For example, an external apparatus (not illustrated) of the camera 100 may have some or all of functional units illustrated in FIG. 4 described later, and execute similar processing to control the operation of the camera 100. The external apparatus of the camera 100 may be, for example, a server, a personal computer, or a mobile terminal such as a smartphone, and any device can be adopted.

Functional Configuration

Figure 4:
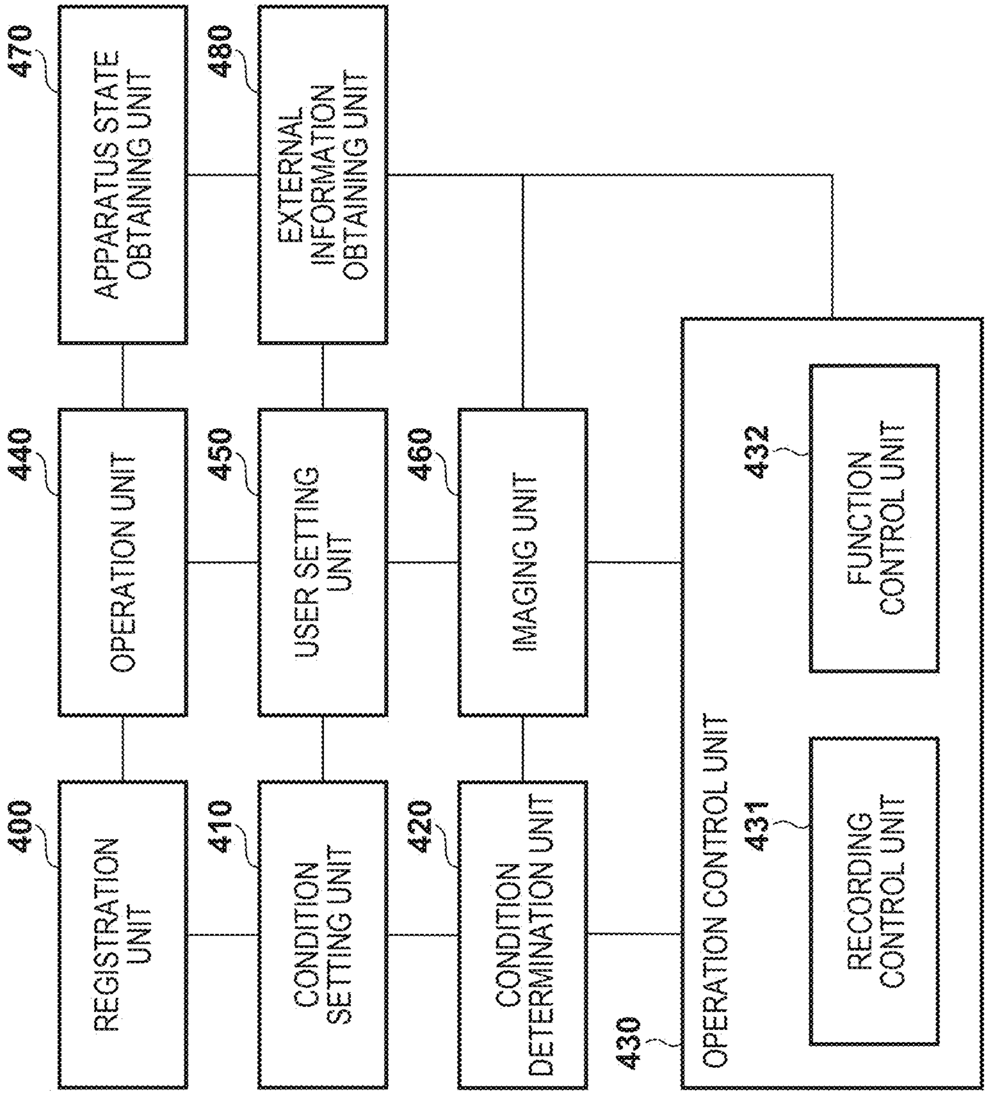
FIG. 4 is a block diagram illustrating an example of a functional configuration of the imaging apparatus according to a first embodiment.

FIG. 4 is a block diagram illustrating an example of the functional configuration of the camera 100 according to the present embodiment. Each functional unit illustrated in FIG. 4 functions by the CPU 212 electrically controlling each unit of the camera 100. The camera 100 includes a registration unit 400, a condition setting unit 410, a condition determination unit 420, an operation control unit 430, a recording control unit 431, a function control unit 432, an operation unit 440, a user setting unit 450, an imaging unit 460, an apparatus state obtaining unit 470, and an external information obtaining unit 480.

The registration unit 400 performs registration of the user of the camera 100. By registering the user in advance, the registration unit 400 can record an image imaged by the recording control unit 431 described later and information on the user in association with each other. As the information on the user, for example, metadata or the like that assures authenticity of the photographer can be used, and a detailed description will be given later.

The condition setting unit 410 sets a usage condition of the imaging apparatus. The condition determination unit 420 determines whether or not the usage condition set by the condition setting unit 410 is satisfied. The usage condition of the imaging apparatus is a condition under which a user corresponding to the usage condition is assumed to use the camera 100 in a case where the usage condition is satisfied, for example. Hereinafter, the "user corresponding to the usage condition" means a user set as using the camera 100 in a case where the usage condition is satisfied, and the "usage condition corresponding to the user" refers to a usage condition set as that under which the user is using the camera 100. The usage condition will be described in detail later.

The operation control unit 430 controls association between an imaged image and information on the user. In the example of FIG. 4, the operation control unit 430 includes the recording control unit 431 and the function control unit 432. The recording control unit 431 controls whether or not to record an imaged image and information on the user in association with each other based on a result of the determination by the condition determination unit 420. The function control unit 432 controls the function of the imaging apparatus based on the result of the determination by the condition determination unit 420. The processing by the function control unit 432 will be described in a third embodiment described later.

The operation unit 440 obtains the content of the operation by the user. The operation unit 440 can obtain, for example, information indicating the content of an operation to the imaging apparatus via the operation member 103, the operation member 104, and the operation member 105.

The user setting unit 450 sets the user of the imaging apparatus. For example, the user setting unit 450 may set all the users registered in advance by the registration unit 400 as users, or may register some of them as users. The condition setting unit 410 can set the usage condition for each user set by the user setting unit 450.

The imaging unit 460 performs imaging of a photo or a moving image by converting an imaging signal from the imaging element 211 into video information. The apparatus state obtaining unit 470 obtains the state of the apparatus including position information, time information, motion information on the imaging apparatus, information on the imaging target, or the like using the GPS reception unit 308, the timer 309, the inertial sensor 310, and the image recognition unit 311. The external information obtaining unit 480 obtains information from an external device (apparatus different from the camera 100) using the communication unit 307.

Content of First Embodiment

The camera 100 according to the present embodiment sets a condition (usage condition) for the user of the imaging apparatus to use the apparatus in advance, and performs determination as to whether or not the usage condition is satisfied. Next, the camera 100 controls the operation based on the determination result as to whether or not the usage condition is satisfied. For example, in a case where the usage condition is satisfied at the time of imaging, the camera 100 can record, without performing identity authentication of the user, authenticity assurance information indicating that the user corresponding to the usage condition has imaged the image. Hereinafter, an example of such processing will be described.

The camera 100 according to the present embodiment performs registration of a "person A" who is a user to the imaging apparatus. Thereafter, as the usage condition (condition under which the "person A" is assumed to be using the imaging apparatus in a case where the usage condition is satisfied), the position condition is set as "in B City, A Prefecture", the time condition as "between 8:00 and 17:00 on 20XX/YY/ZZ", and the condition for imaging target as "person".

Here, the usage condition is assumed to be satisfied in a case where imaging is performed at a position satisfying the position condition, imaging is performed at a time satisfying the time condition, and a subject recognized from the imaged image satisfies the condition for imaging target. In this manner, in the present embodiment, the usage condition includes a plurality of conditions, and the usage condition is satisfied when all of the conditions are satisfied, but the usage condition may be satisfied when some (e.g., one, or two or more) of the conditions included in the usage condition are satisfied. Furthermore, the usage condition may include not a plurality of conditions but only one condition.

The condition setting unit 410 according to the present embodiment can set a condition regarding the state of the apparatus obtained by the apparatus state obtaining unit 470 as the usage condition. For example, as the state of the apparatus, the condition setting unit 410 may set the usage condition including the condition regarding the position of the imaging apparatus, the time of imaging, or the imaging target of the imaging apparatus as described above. Furthermore, for example, the condition setting unit 410 may set a usage condition including a condition regarding the motion of the imaging apparatus described later. Furthermore, although details will be described later, the condition setting unit 410 can set a condition regarding information obtained from the external device by the external information obtaining unit 480 as the usage condition.

After confirming whether the usage condition to be set overlaps the usage condition for another user, the camera 100 completes setting of the usage condition (performs resetting when the usage condition overlaps the usage condition). At the time of imaging, the camera 100 images one image, and then the condition determination unit 420 performs determination as to the position at the time of imaging is "in B City, A Prefecture", whether or not the time at the time of imaging is "between 8:00 and 17:00 on 20XX/YY/ZZ", and whether or not the imaging target is the "person".

When both of these conditions are satisfied, the camera 100 determines that the user is identified to be the "person A", and can record the imaged image in association with the image imaged by the "person A". Here, the imaged image associated with the information on the user may be a still image or a video imaged by the camera 100.

Flowchart

The processing for the user of the imaging apparatus to perform registration and condition setting by the camera 100 according to the present embodiment will be described with reference to the flowchart of FIG. 5A.

Registration of User

First, in S500, the registration unit 400 performs registration of the user of the imaging apparatus. Here, the registration of the user means that the person who plans use of the imaging apparatus is registered in the imaging apparatus in advance. In this example, the following description will be given on an assumption that the registration unit 400 registers the "person A" as the user of the imaging apparatus.

Setting of User

In S501, the user setting unit 450 performs setting of the user of the imaging apparatus. Here, the setting of the user means specifying the user who actually uses the imaging apparatus from among the users registered in the imaging apparatus and bringing the user into a selected state. Here, after the setting of the user is performed, the condition setting unit 410 sets the usage condition for the user in the subsequent processing. Next, the condition determination unit 420 performs determination using the usage condition for the user, and in a case where the condition is satisfied, the information on the user is recorded in association with the imaged image. In this example, the following description will be given on an assumption that the user setting unit 450 sets the "person A" as the user of the imaging apparatus.

Setting of Condition

In S502 to S506, the condition setting unit 410 sets the usage condition based on the information obtained by the operation unit 440. Here, the person to be registered in S500 is set as the "person A", and the usage condition corresponding to the person A is set in S502 to S506.

Setting of Position Condition

In S502, the condition setting unit 410 sets a condition (position condition) based on the position information on the imaging apparatus as the usage condition. In this example, the operation unit 440 obtains the input of the position condition of "in B City, A Prefecture" by the user, and the condition setting unit 410 performs setting of the position condition based on the information on the input.

Note that here, the condition based on various types of information included in the usage condition is assumed to be a condition satisfied in a case where the information is in a predetermined state. In this example, the condition based on the position information is set to be satisfied in a case where the position of the imaging apparatus is "in B City, A Prefecture".

Setting of Time Condition

In S503, the condition setting unit 410 sets a condition (time condition) based on the time information as the usage condition. In this example, the operation unit 440 obtains an input of the time condition of "between 8:00 and 17:00 on 20XX/YY/ZZ" by the user, and the condition setting unit 410 performs setting of the time condition based on the information on the input.

Setting of Condition for Imaging Target

In S504, the condition setting unit 410 sets a condition (condition for imaging target) based on the information on the imaging target as the usage condition. Here, the information on the imaging target is assumed to be information on a subject (imaging target) recognized from the imaged image, but is not particularly limited as long as the information is information on the imaging target, such as information designating the imaging target, for example. For example, the apparatus state obtaining unit 470 can obtain the information on the imaging target from the imaging target in the imaged image using the image recognition unit 311. In this example, information indicating the category of the imaging target is used as information on the imaging target, the operation unit 440 obtains designation of the category of the imaging target as "person" by the user, and the condition setting unit 410 performs setting of the condition for imaging target based on the information on the input. The designation of the category of the imaging target may be performed, for example, by designation of the subject in the image, or may be performed by input of characters or the like.

Confirmation of Overlapping Condition

In S505, the camera 100 performs determination as to whether or not the usage conditions that are input in S502 to S504 are appropriate. For example, in a case where the usage condition for the user who performs setting this time overlaps the usage condition of another user already set in the imaging apparatus, it is conceivable that it is difficult to determine which user to record in association with the image when the usage condition is satisfied. From such a viewpoint, here, the camera 100 determines whether or not the user satisfying the usage condition input in S502 to S504 has already been registered, and if the user has already been registered, it is determined that the usage condition to be set is inappropriate, and the processing of FIG. 5A is ended without setting the usage condition. Here, if the usage condition has been not registered, it is determined that the usage condition to be set is appropriate, and the processing proceeds to S506. In this example, it is assumed that there is no user registered in advance in the imaging apparatus at the time of performing the processing of the present flow, and the conditions input in S502 to S504 are determined to be appropriate.

Figure 5A:
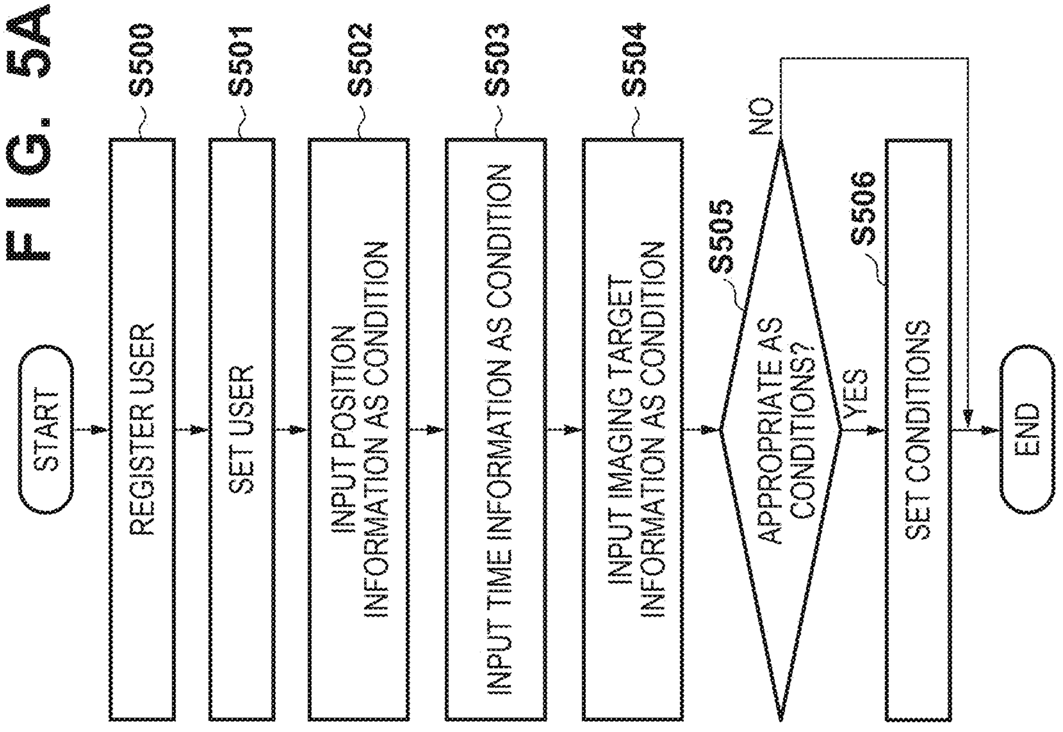
FIG. 5A and FIG. 5B are flowcharts showing an example of processing performed by the imaging apparatus according to the first embodiment.

In S506, the condition setting unit 410 sets the conditions input in S502 to S504 as the usage condition, and ends the processing of FIG. 5A.

Determination of Condition

Figure 5B:
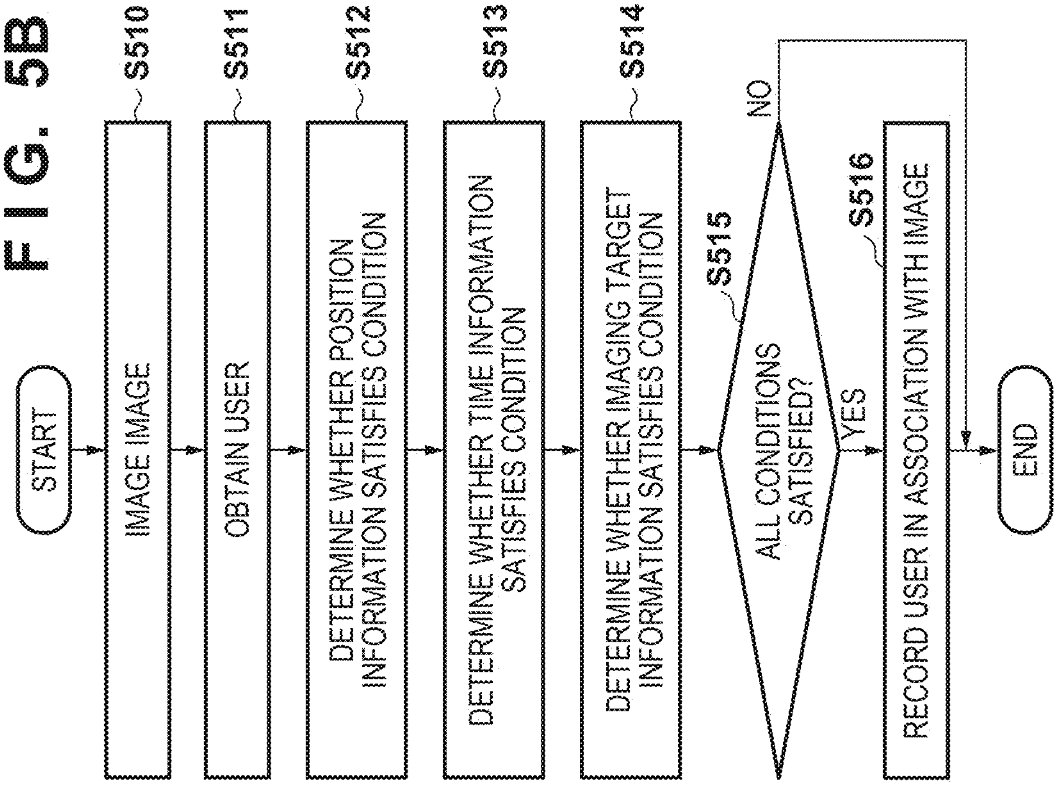
Figure 6:
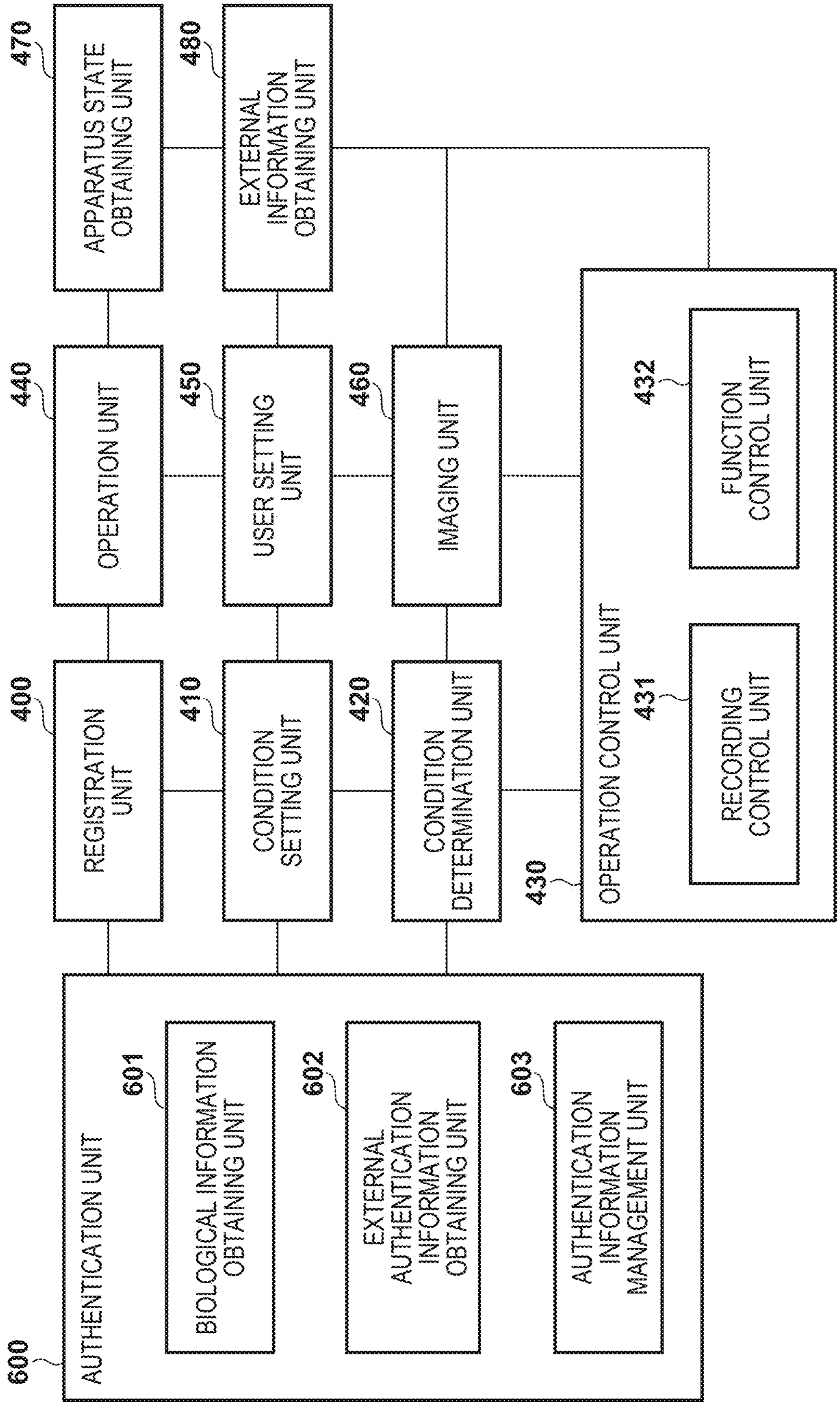
FIG. 6 is a block diagram illustrating an example of a functional configuration of an imaging apparatus according to a second embodiment.

Next, an example of condition determination processing and recording processing when the user of the imaging apparatus performs imaging by the camera 100 will be described with reference to the flowchart of FIG. 5B.

First, in step S510, the imaging unit 460 executes imaging of an image. Next, in S511, the user setting unit 450 obtains information on the user that is set.

In S512 to S514, the condition determination unit 420 performs determination as to whether or not each condition included in the usage condition is satisfied.

Determination of Position Condition

In S512, the condition determination unit 420 determines whether the position information on the imaging apparatus satisfies the position condition. Here, the condition determination unit 420 determines whether or not current position coordinates are within the range of the set place based on the current position coordinates obtained by the apparatus state obtaining unit 470 using the GPS reception unit 308. In this example, in S502, the position condition is set as "in B City, A Prefecture", and the current position coordinates are obtained as "in B City, A Prefecture", and it is determined that the position condition is satisfied.

Determination of Time Condition

In S513, the condition determination unit 420 determines whether the time information on the imaging apparatus satisfies the time condition. Here, the condition determination unit 420 determines whether or not current time is within the range of the set time based on the current time obtained by the apparatus state obtaining unit 470 using the GPS reception unit 308. In this example, in S503, the time condition is set to "between 8:00 and 17:00 on 20XX/YY/ZZ", and the current time is obtained as "9:00 on 20XX/YY/ZZ", and it is determined that the time condition is satisfied.

Determination of Condition for Imaging Target

In S514, the condition determination unit 420 determines whether the imaging target information on the imaging apparatus satisfies the condition. Here, the condition determination unit 420 determines whether or not the category of the imaging target is the set category based on the category information on the imaging target recognized from the imaged image by the apparatus state obtaining unit 470 using the image recognition unit 311. In this example, in S504, the condition for the imaging target is set as "person", the category of the subject in the imaged image is obtained as "person", and it is determined that the condition for imaging target is satisfied.

In S515, it is determined whether or not the usage condition is satisfied. Here, it is assumed that the usage condition is satisfied when all the conditions included in the usage condition are satisfied. If the usage condition is satisfied, the processing proceeds to S516, and otherwise, the processing ends without performing association of the user with the imaged image. In this example, since it is determined that the position of the imaging apparatus is "in B City, A Prefecture", the time is "9:00 on 20XX/YY/ZZ", the category of the imaging target is "person", and all the conditions are satisfied, the processing proceeds to S516.

In S516, the recording control unit 431 records the information on the user in association with the imaged image. Here, the recording control unit 431 assigns the image with metadata assuring authenticity of the photographer that "the photographer is the person A". Note that if the authenticity assurance is unnecessary, processing such as recording the information on the user as metadata may be performed.

The form of the information on the user recorded in association with the imaged image is not limited to metadata. For example, the information on the user may be recorded in the form of a table in which the hash value of video data and the information on the user are associated with each other, or may be recorded by connecting to an external server by wireless communication and uploading the video data and the information on the user in the form of a record in which they are combined. Furthermore, these pieces of information may further include information for preventing falsification or assuring authenticity, such as encryption or electronic signature. Furthermore, in a case where the usage condition is not satisfied, the imaged image need not be assigned with the information on the user, and information indicating that "the photographer is unspecified" may be associated.

According to such a configuration, it is possible to set the usage condition of the imaging apparatus to the imaging apparatus, and it is possible to control the operation of the imaging apparatus based on whether or not such a usage condition is satisfied. In particular, the position information, the time information, and the imaging target information as described above may be used as the usage condition, and when they are satisfied, the information on the user corresponding to the usage condition may be associated with the imaged image. In this manner, by setting in advance the condition under which the imaging apparatus is planned to be used as described above, if the usage conditions are satisfied, it is possible to record the information on the user in association with the imaged image without performing personal authentication during imaging.

Modification of First Embodiment

In the first embodiment, the description has been given on the assumption that the position condition, the time condition, and the condition for imaging target are used as the usage condition. Here, as a modification, a case where the motion information on the imaging apparatus or the external information on the imaging apparatus is used as the usage condition will be described.

For example, in a case where imaging is performed while the imaging apparatus is stationary, such as a case where a fixed point imaging apparatus that performs imaging at regular time intervals is fixed with a tripod, it is conceivable to determine that such imaging is imaging by the user. For example, the apparatus state obtaining unit 470 can obtain the motion information (e.g., information on whether or not the imaging apparatus is stationary, which is obtained by using an acceleration sensor, a gyro sensor, or the like) of the imaging apparatus. In this case, the condition setting unit 410 can set a condition based on the motion information as the usage condition corresponding to the user.

For example, the condition setting unit 410 may assume that the usage condition is satisfied in a case where the imaging apparatus is determined to be not moving (be fixed) based on the motion information. Here, the state where "the imaging apparatus is fixed" can be arbitrarily defined by the user as long as the state is defined based on the motion information. For example, the condition setting unit 410 may define a state where the imaging apparatus does not move in a predetermined period (e.g., 5 minutes) immediately before execution of the imaging as the state where "the imaging apparatus is fixed". Furthermore, in a case where a condition based on the motion information is used as the usage condition, the condition setting unit 410 may further include, in the usage condition, a condition (e.g., the above-described position condition, time condition, or condition for imaging target) other than the condition based on such motion information.

Furthermore, for example, even in a case where the photographer performs imaging in a state of being away from the imaging apparatus, such as drone imaging, it is conceivable to desire to associate the imaging as imaging by the user. From such a viewpoint, the condition setting unit 410 can set, as the usage condition, a condition (external condition) based on information (external information) obtained from an external device cooperating with the imaging apparatus. The external information obtaining unit 480 can cause, for example, a token device that issues a one-time password to cooperate with the imaging apparatus and obtain a result of personal authentication in the token device as external information. In this case, the usage condition is assumed to be satisfied when the personal authentication in the token device is successful.

Furthermore, when an external condition is used as the usage condition, the condition setting unit 410 may further include a condition other than the external condition in the usage condition. Furthermore, an expiration date may be set for the result of the personal authentication used here. According to such processing, the user needs to periodically perform personal authentication, and more secure imaging is possible.

Note that in the present embodiment, the description has been given on the assumption that the personal name (real name, handle name, or the like) of the user such as the "person A" is used in various types of processing such as registration, but the present disclosure is not particularly limited to this as long as the user can be represented in an identifiable manner. The name associated with the imaged image may be a personal name of the user or a group name including the user. For example, the name associated with the imaged image may be an imaging team name to which the user belongs, or may be a specific character string such as an ID. Furthermore, such information on the user such as the information on the registrant may be obtained by the user directly inputting the information into the camera 100, or may be obtained via an external device.

Note that the number of users registered in the imaging apparatus is not limited. In a case where a plurality of users are registered, the usage condition may be set for each user. Furthermore, in a case where the user registered in advance is registered again, the information on the user registered in advance may be overwritten, or the change point may be obtained from the stored change history and displayed to the user.

Furthermore, in the present embodiment, the description has been given on the assumption that confirmation is performed in S505 so that the setting conditions of the users do not overlap when the usage condition of the imaging apparatus is set. Therefore, in this example, the users corresponding to one usage condition do not overlap. In FIG. 5B, the description has been given on the assumption that the user setting unit 450 performs the setting of the user in S511 and determines whether or not the usage condition corresponding to the set user is satisfied, but the user satisfying the usage condition may be automatically selected based on the obtained various types of information without performing the processing in S511.

Furthermore, in the present embodiment, the description has been given on the assumption that the condition setting unit 410 sets the position condition in the range of "in B City, A Prefecture". However, the position condition is not particularly limited to this as long as the condition designates within a range of a specific position. For example, the position condition may be set as "a range of a specific distance from a specific position coordinates" or the like.

Furthermore, in the present embodiment, the description has been given on the assumption that determination of the position condition is performed using the position information obtained by the apparatus state obtaining unit 470 using the GPS reception unit 308. However, the obtaining of the position information is not particularly limited to such a method, and the obtaining of the position information may be performed by communication, for example, by Wi-Fi, beacon, a base station, or the like.

Furthermore, in the present embodiment, the description has been given on the assumption that the condition setting unit 410 sets the time condition in the range of "between 8:00 and 17:00 on 20XX/YY/ZZ". However, the time condition is not particularly limited to this as long as the condition designates within a range of a specific time, and for example, it may be set as "until a specific time elapses from a specific time" or "after the current time".

Furthermore, in the present embodiment, the description has been given on the assumption that determination of the time condition is performed using the time information obtained by the apparatus state obtaining unit 470 using the GPS reception unit 308. However, the obtaining of the current time is not particularly limited to such a method, and for example, time information set in the imaging apparatus or time information obtained by the external information obtaining unit 480 from an external device may be used.

Furthermore, in the present embodiment, the description has been given on the assumption that determination as to whether or not the category of the imaging target is a set category is performed based on the category information on the imaging target recognized from the imaged image by the apparatus state obtaining unit 470 using the image recognition unit 311. However, it is not necessary to use the category information as the imaging target information in the imaged image, and it is possible to use arbitrary information obtained using a known method of obtaining information on the subject using image recognition. For example, whether or not "the subject is in a specific color (e.g., a blue object)" may be used as the condition for imaging target, or a moving speed of the imaging target may be calculated and a condition regarding the moving speed may be used.

Furthermore, in the present embodiment, the description has been given on the assumption that the motion information on the imaging apparatus is obtained using the acceleration sensor, the gyro sensor, or the like included in the imaging apparatus, but the present disclosure is not particularly limited to this as long as the motion of the imaging apparatus can be obtained. For example, determination of the motion of the imaging apparatus may be performed using the image feature amount information obtained from the image that is imaged.

In the present embodiment, the description has been given on the assumption that the result of the personal authentication in the token device is used as the external information, but any external information may be used as long as the external information is information for identifying the photographer. For example, specific signal information or the like transmitted from a smartphone may be used as the external information.

Furthermore, in the present embodiment, the description has been given on the assumption that the recording control unit 431 records the imaged image and the user in association with each other when the usage condition is satisfied, but the control content is not particularly limited to this as long as recording control is performed depending on whether or not the usage condition is satisfied. For example, a condition for prohibiting recording by the recording control unit 431 may be set. The condition determination unit 420 outputs a determination result by a combination of the conditions set as described above.

Furthermore, as the usage condition, the position condition, the time condition, the imaging target condition, a condition based on the motion information on the imaging apparatus, and an external condition may be freely combined, and these determination processing may be performed in any order. Furthermore, it is not necessary to set all these conditions as the usage condition, and the setting items may be increased or decreased as necessary, or a plurality of settings may be performed for the conditions of the same step.

In the present embodiment, the setting is performed by directly inputting the conditions to the imaging apparatus, but it is not necessarily required. For example, a complicated condition including conditional branches, such as "information on the 'person A' is associated with the image between 8:00 and 17:00 on 20XX/YY/ZZ, and information on the 'person B' is associated with the image between 18:00 and 22:00 on 20XX/YY/ZZ", may be input as a script file.

Second Embodiment

The description has been given on the assumption that the imaging apparatus according to the first embodiment records an imaged image in association with information on the user in a case where a usage condition set in advance is satisfied. By performing identity authentication of the user at the time of setting the usage condition, the imaging apparatus according to the present embodiment suppresses the imaged image from being associated with information on another person. Furthermore, in the present embodiment, by performing personal authentication also at the time of imaging, it is possible to prevent another person from associating the imaged image with user information.

In the present embodiment, an example will be described in which it is confirmed that the user of the imaging apparatus is the person themselves by performing personal authentication at the time of setting the usage condition and at the time of imaging, and the authenticity assurance information indicating that the image is imaged by the user is recorded in the imaged image.

The imaging apparatus according to the present embodiment performs registration of the "person A", which is the user, and "feature amount information on the eyeball", which is biological information on the "person A". Thereafter, when the usage condition is set, personal authentication is performed using the feature amount information on the eyeball, and the position condition is set when it is confirmed that the user is the person themselves (here, "in B City, A Prefecture" is set as the position condition). Furthermore, also at the time of imaging, personal authentication is performed using the feature amount information on the eyeball, and the authenticity assurance information indicating that the image is imaged by the user is recorded in the imaged image when it is confirmed that the user is the person themselves.

Hereinafter, a description will be given on an assumption that the above-described biological information is used as the authentication information at the time of performing authentication. However, the authentication information is not limited to this, and any information can be used as long as the information can be used at the time of performing personal authentication. For example, an ID and a password may be set in the imaging apparatus, and personal authentication may be performed by receiving input of the ID and the password from the user at the time of personal authentication. Furthermore, in place of this ID, arbitrary information for distinguishing the user may be registered in association with the password. Furthermore, for example, an external authentication information obtaining unit 602 may obtain a result of personal authentication performed by an external device, thereby performing authentication that the photographer is identified to be the user.

The camera 100 according to the present embodiment has an outer appearance, a cross-sectional view, and a hardware configuration similar to those of the first embodiment. Furthermore, the camera 100 according to the present embodiment has a functional configuration similar to that illustrated in FIG. 4 except inclusion of an authentication unit 600, and therefore overlapping description will be omitted.

The authentication unit 600 performs personal authentication processing and obtaining processing of information necessary for performing the authentication processing. The authentication unit 600 according to the present embodiment includes a biological information obtaining unit 601, the external authentication information obtaining unit 602, and an authentication information management unit 603. The biological information obtaining unit 601 obtains biological information on the user. In the present embodiment, feature amount information on the eyeball is used as the biological information. The external authentication information obtaining unit 602 obtains authentication information from the outside of the imaging apparatus. The authentication information management unit 603 manages obtained authentication information.

An example of processing when the user of the imaging apparatus registers authentication information (feature amount information on the eyeball) by the camera 100 according to the present embodiment will be described with reference to the flowchart of FIG. 7A.

Registration of Biological Information in Association with User

In S700, the registration unit 400 starts registration processing of the authentication information on the user of the imaging apparatus. Here, the following description will be given on an assumption that the registration unit 400 obtains an input that the person who performs the registration processing of the authentication information is the "person A". Note that a description will be given on an assumption that the biological information is used as the authentication information in FIG. 7A, but different authentication information such as an ID and a password may be registered and used as described above.

In S701, the biological information obtaining unit 601 obtains authentication information on the user. Here, the biological information obtaining unit 601 obtains, as the authentication information, feature amount information on the eyeball of the user who looks into the eyepiece lens 102, which is the biological information.

In S702, the authentication information management unit 603 performs determination as to whether the user and the authentication information can be registered in association with each other. For example, when the feature amount information on the eyeball to be registered has not yet been registered, the authentication information management unit 603 can determine that the feature amount information and the user can be registered in association with each other. Here, it is assumed that there is no user registered in advance and it is determined that the user can be registered. In a case where there is an already registered user, it is determined, by using the feature amount information on the eyeball, whether or not the user currently about to register has already been registered, and if the user has already been registered, the registration of the user is canceled.

Figures 7A, 7B, 7C:
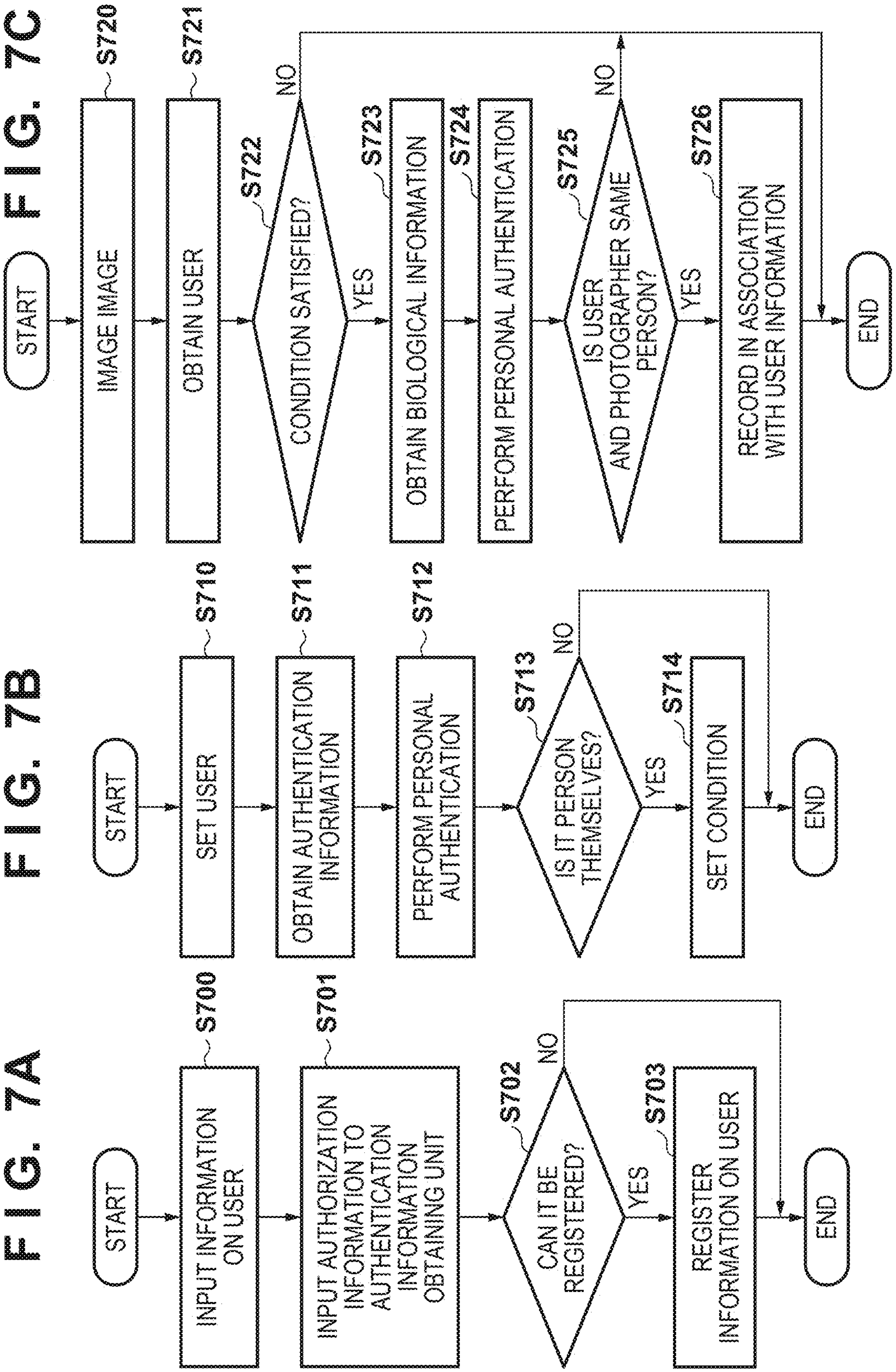
FIG. 7A, FIG. 7B, and FIG. 7C are flowcharts showing an example of processing performed by the imaging apparatus according to the second embodiment.

In S703, the registration unit 400 performs registration of the biological information on the user, and ends the processing of FIG. 7A. Note that if anyone can perform this registration processing, it is conceivable that the reliability of the record content of the imaging apparatus is impaired. Therefore, the reliability of the record content may be enhanced by setting a password in the imaging apparatus, and preventing user registration unless the password is input.

Next, an example of processing performed by the camera 100 when the user of the imaging apparatus performs personal authentication using the feature amount information on the eyeball when performing condition setting will be described with reference to the flowchart of FIG. 7B.

Perform Personal Authentication Using Biological Information, and Condition Setting First, in S710, the user setting unit 450 sets a user who performs setting of a corresponding usage condition. Here, it is assumed that the "person A" registered by the processing shown in FIG. 7A is set. In S711, the biological information obtaining unit 601 obtains authentication information (here, the feature amount information on the eyeball).

In step S712, the authentication unit 600 performs personal authentication on whether the feature amount information on the eyeball obtained in step S711 is the feature amount information on the eyeball of the "person A" set as the user. In step S713, the authentication unit 600 determines whether or not the personal authentication in step S712 has succeeded, and the processing proceeds to step S714 if the personal authentication has succeeded, and the processing in FIG. 7B ends if the personal authentication has failed.

In S714, the condition setting unit 410 sets the usage condition corresponding to the user. The processing in S714 can be performed similarly to that described in FIG. 5A of the first embodiment, and a detailed description thereof will be omitted here. Here, it is assumed that the authentication of the "person A" is successful, and "in B City, A Prefecture" is set as the position condition. If the authentication fails, the usage condition is not set.

Next, personal authentication processing using the feature amount information on the eyeball in the recording processing of the user of the imaging apparatus will be described with reference to the flowchart of FIG. 7C.

Perform Personal Authentication Using Biological Information, and Recording Control at Time of Imaging First, in step S720, the imaging unit 460 executes imaging of an image. Next, in S721, the user setting unit 450 obtains information on the user that is set. Here, it is assumed that information on "person A" is obtained as the user.

In S722, the condition determination unit 420 performs determination as to whether or not the usage condition is satisfied, and the process proceeds to S723 if the usage condition is satisfied, and otherwise, the processing ends. In this example, since the usage condition corresponding to the "person A" is set to "in B City, A Prefecture", and the imaging place is "in B City, A Prefecture", it is determined that the condition is satisfied.

In S723, the biological information obtaining unit 601 obtains the feature amount information on the eyeball. In S724, the authentication unit 600 performs personal authentication on whether the feature amount information on the eyeball obtained in S723 is biological information on the "person A" set as the user.

In S725, the recording control unit 431 performs determination as to whether or not to record the imaged image and the information on the user in association with each other based on the result of the personal authentication in S724. If the personal authentication is successful, the process proceeds to S726, and in S726, the recording control unit 431 records the imaged image and the information on the user in association with each other, and ends the processing. If the personal authentication fails, the imaged image and the information on the user are not recorded in association with each other, and the process ends. In the present embodiment, it is confirmed by biometric authentication that the photographer is the "person A" set as the user, and the imaged image and the information on the user are recorded in association with each other.

According to such processing, the personal authentication is performed at the time of setting the usage condition and at the time of imaging, and only when it is confirmed that the user of the imaging apparatus is the person themselves, the information on the photographer can be assigned to the imaged image in a form where the authenticity is assured.

Note that in the present embodiment, the example of using the feature amount information on the eyeball of the user as the biological information has been described, but any method may be used as long as it is a personal authentication method using biological information. For example, personal authentication using fingerprint information or voiceprint information on the user may be performed.

Furthermore, the camera 100 may include an information change unit (not illustrated) that changes the usage condition based on an input from an external device. For example, in a case where the imaging apparatus is taken by another person by mistake, if the condition is satisfied, there is a possibility that the information on the user is recorded in association with the image imaged by the imaging apparatus. From such a viewpoint, the information change unit of the camera 100 may newly obtain the usage condition of the change destination together with the success result of the personal authentication from the external device, and change the usage condition.

Furthermore, in the present embodiment, the description has been given on the assumption that the user setting unit 450 performs setting of the user and performs personal authentication by collation between authentication information associated with the set user and obtained authentication information. However, such processing is not particularly limited to this as long as collation with the registered user can be performed, and for example, in a case where the obtained registration information matches any authentication information on the registered user, the processing of S714 or S726 may be executed on an assumption that the personal authentication has succeeded.

Furthermore, registration of the user with respect to the imaging apparatus may be executable by an arbitrary person, and the registration may be provided with a restriction for security improvement. For example, in a case where a predetermined condition such as "input of a password set to the imaging apparatus" or "connect a dongle to the imaging apparatus" is satisfied before the user is registered, registration processing of the user with respect to the imaging apparatus may be started.

Third Embodiment

The camera 100 according to the second embodiment performs personal authentication at the time of registration, at the time of condition setting, and at the time of imaging, and controls processing of recording information on the user and an imaged image in association with each other depending on success or failure of the personal authentication. This prevents another person from recording information on the user in association with the imaged image. The camera 100 according to the present embodiment sets a second usage condition and controls the function of the imaging apparatus depending on whether or not the second usage condition is satisfied. Hereinafter, an example of such processing will be described. The camera 100 according to the present embodiment has a configuration similar to that according to the second embodiment and can execute similar processing, and therefore overlapping description will be omitted.

The condition setting unit 410 according to the present embodiment sets the second usage condition. Although a specific example will be described later, the second usage condition is a usage condition of the imaging apparatus set similarly to the usage condition (hereinafter, this may be called a "first usage condition" to be distinguished from the second usage condition) in the first embodiment. The second usage condition may be an identical condition to the first usage condition, or may be set separately from the first usage condition. The condition determination unit 420 can perform determination as to whether or not the second usage condition is satisfied, similarly to the processing under the first usage condition.

The function control unit 432 according to the present embodiment controls the function of the camera 100 depending on whether the second usage condition is satisfied. For example, the function control unit 432 can restrict the function of the camera 100 when the second usage condition is not satisfied. Restricting the function of the camera 100 may be, for example, stopping the imaging function. Hereinafter, control (restriction) of such a function will be described together with a specific example.

For example, in the following cases, effects of controlling the function of the imaging apparatus can be confirmed.

(1) Case where the usage time contracted at the time of renting of the imaging apparatus has passed (2) Case where someone other than the user contracted at the time of renting of the imaging apparatus is using the imaging apparatus (3) Case where the imaging apparatus is stolen Control of the function of the imaging apparatus can be, for example, performing control such that imaging processing cannot be executed (stop and restrict the imaging function). The function of the imaging apparatus controlled here is not limited to the imaging function, and for example, in a case where each condition as described below is not satisfied, "prohibition of recording the imaged image", "prohibition of uploading data to the cloud", "prohibition of displaying setting information on the imaging apparatus", or the like may be performed.

In the case of (1), for example, the condition setting unit 410 sets a condition regarding time in advance (e.g., at the time of the rental contract of the imaging apparatus). When the imaging apparatus no longer satisfies such a condition regarding the time, the function control unit 432 can stop the imaging function of the imaging apparatus.

As the condition used here, a condition regarding the position or the like may also be used.

In the case of (2), for example, the camera 100 performs registration of the feature amount information on the eyeball of the user in advance (e.g., at the time of the rental contract of the imaging apparatus). When the authentication unit 600 determines that the user of the imaging apparatus is not the user registered as described above, the function control unit 432 can stop the imaging function of the imaging apparatus.

In the case of (3), for example, the condition setting unit 410 sets a condition regarding the position in advance. When the imaging apparatus no longer satisfies such a condition regarding the position, the function control unit 432 can stop the imaging function of the imaging apparatus on an assumption that there is a possibility of theft.

As the condition used here, a condition regarding the time or the like may also be used.

Fourth Embodiment

The camera 100 according to the present embodiment obtains authentication information and specifies the user of the camera 100 based on the authentication information. Next, the camera 100 controls the recording processing so as to record the information on the user in association with the imaged image if the user is specified based on the authentication information at the time of imaging, and controls the recording processing so as to record the information on the user corresponding to the usage condition in association with the imaged image if the user is not specified and the usage condition is satisfied. Hereinafter, such a camera 100 according to the present embodiment will be described.

The camera 100 according to the present embodiment has a configuration similar to that according to the second embodiment and can execute similar processing, and therefore overlapping description will be omitted. The authentication unit 600 according to the present embodiment specifies the user of the camera 100 based on the authentication information obtained by the biological information obtaining unit 601. Here, it is assumed that the user and the authentication information are registered in association with each other in advance by the processing as shown in FIG. 7A. The specification based on the authentication information from the user registered in advance can be performed by arbitrarily using general authentication processing, and a detailed description here is omitted. Furthermore, the authentication unit 600 may specify the user of the camera 100 by setting the user to be authenticated similarly to S710 and performing determination as to whether or not the authentication information associated with such a user and the authentication information obtained by the biological information obtaining unit 601 match.

In a state where the user is not specified based on the authentication information and in a case where the usage condition is satisfied, the recording control unit 431 controls the recording processing so as to record the information on the user corresponding to the usage condition in association with the imaged image. Furthermore, in a state where the user is not specified based on the authentication information and in a case where the usage condition is not satisfied, the recording control unit 431 does not associate the information on the user with the imaged image. Hereinafter, an example of processing performed by such a camera 100 will be described with reference to FIG. 8.

Figure 8:
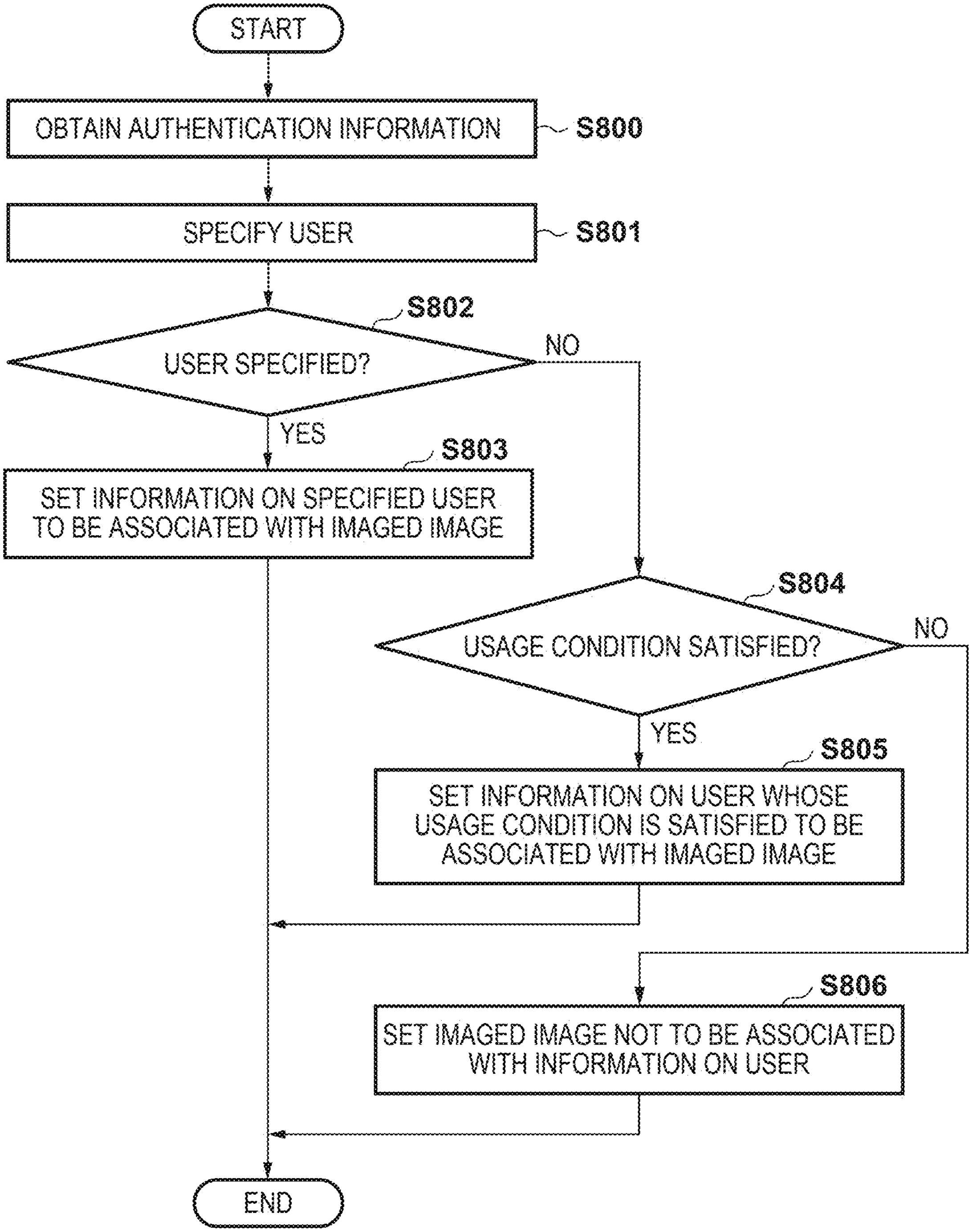
FIG. 8 is a flowchart showing an example of processing performed by an imaging apparatus according to a fourth embodiment.

FIG. 8 is a flowchart showing an example of control processing in accordance with whether or not the user can be specified by the camera 100 according to the present embodiment. Note that in the present embodiment, it is assumed that the usage condition is set in advance by the condition setting unit 410 similarly to the first embodiment.

In S800, the biological information obtaining unit 601 obtains authentication information. This processing can be executed similarly to S711.

In S801, the authentication unit 600 specifies the user of the imaging apparatus based on the authentication information obtained in S800. In S802, the authentication unit 600 performs determination as to whether or not the user is specified, and proceeds with the processing to S803 if the user is specified, and proceeds with the processing to S804 if the user is not specified. In step S803, the recording control unit 431 sets the information on the user specified in step S801 to be recorded in association with the imaged image, and ends the processing of FIG. 8. When the imaged image is imaged in the state set in this manner, the imaged image is recorded in association with the information on the user specified in S801.

In S804, the condition determination unit 420 performs determination as to whether or not the usage condition is satisfied, and the process proceeds to S805 if the usage condition is satisfied, and otherwise, the processing proceeds to S806. Here, the condition determination unit 420 can perform determination as to whether or not the usage condition is satisfied by determining whether or not there is a user satisfying the corresponding usage condition among the users registered in advance based on various types of information used for determination of the usage condition such as the position or the current time of the imaging apparatus obtained similarly to the first embodiment.

In S805, the recording control unit 431 sets the information on the user whose usage condition is satisfied in S804 to be recorded in association with the imaged image, and ends the processing of FIG. 8. When the imaged image is imaged in the state set in this manner, the imaged image is recorded in association with the information on the user whose usage condition is satisfied in S804.

In S806, the recording control unit 431 sets the imaged image not to be associated with the information on the user, and ends the processing of FIG. 8. When the imaged image is imaged in the state set in this manner, the imaged image is recorded without being associated with the information on the user.

When the camera 100 images an imaged image in a state where the processing shown in FIG. 8 is finished, the camera 100 according to the present embodiment controls, depending on the processing result shown in FIG. 8, recording processing including association of information on the user with the imaged image. Here, if the user is specified based on the authentication information, control is performed such that the information on the specified user is associated with the imaged image. Furthermore, if the user is not specified and the usage condition is satisfied, control is performed such that the information on the user corresponding to the satisfied usage condition is associated with the imaged image. Here, the setting of the recording processing as described in S804 to S806, for example, may be performed before the imaging is started, or may be performed when the imaged image is obtained, and the same applies to the image imaged under the same condition.

According to such a configuration, the user of the imaging apparatus is specified based on the obtained authentication information, and if the user is specified, the recording processing can be controlled so as to record the information on the specified user in association with the imaged image. Furthermore, if the user is not specified and the usage condition is satisfied, the recording processing can be controlled so as to record the information on the user corresponding to the usage condition in association with the imaged image. By this, even when the user cannot be specified based on the authentication information, particularly the biological information, if the usage condition is satisfied, the information on the user corresponding to such a usage condition can be associated with the imaged image, and convenience for the user can be improved.

Note that since the camera 100 according to the present embodiment has a similar configuration to that of the camera 100 according to the second embodiment as described above, it is possible to configure such that each processing described as being performed in the first to third embodiments can be executed simultaneously. For example, in addition to the processing shown in FIG. 8, the camera 100 may control the function of the imaging apparatus depending on the result of the personal authentication.

OTHER EXAMPLES

The present disclosure can also be realized by processing in which a program realizing one or more functions of the above-described embodiments is supplied to a system or an apparatus via a network or a storage medium, and one or more processors in a computer of the system or the apparatus read and execute the program. Furthermore, the present disclosure can also be realized by a circuit (e.g., an ASIC) that realizes one or more functions.

The present disclosure is not limited to the above embodiments and various changes and modifications can be made within the spirit and scope of the present disclosure. Therefore, to apprise the public of the scope of the present disclosure, the following claims are made.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-089244 filed May 31, 2024, which is hereby incorporated by reference herein in its entirety.

The present disclosure improves convenience of an apparatus that records information on a photographer in association with an image.

What is claimed is:

1. An imaging apparatus comprising:

one or more memories configured to store instructions; and one or more processors configured to execute the instructions to:

obtain authentication information;

specify a user of the imaging apparatus based on the authentication information;

set a first usage condition of the imaging apparatus;

perform control such that, in a case where the imaging apparatus performs imaging in a state where a user is specified, an imaged image obtained by the imaging and information on the user are recorded in association with each other; and perform control such that, in a case where the imaging apparatus performs imaging in a state where a user is not specified and in a state where the first usage condition is satisfied, the imaged image obtained by the imaging and information on a user corresponding to the first usage condition are recorded in association with each other, wherein the first usage condition includes a condition regarding a position of the imaging apparatus, a time at which the imaging apparatus performs imaging, an imaging target of the imaging apparatus, or motion of the imaging apparatus.

2. The imaging apparatus according to claim 1, wherein the first usage condition is set for each user of the imaging apparatus.

3. The imaging apparatus according to claim 1, wherein the authentication information is biological information on a user of the imaging apparatus.

4. The imaging apparatus according to claim 1, wherein the authentication information is a result of personal authentication of a user of the imaging apparatus in an external device of the imaging apparatus.

5. The imaging apparatus according to claim 1, wherein an image imaged by the imaging apparatus is a still image or a video.

6. The imaging apparatus according to claim 1, wherein in a case where the imaging apparatus performs imaging in a state where a user is not specified and in a state where the first usage condition is not satisfied, control is performed such that an imaged image obtained by the imaging is recorded not in association with information on a user.

7. The imaging apparatus according to claim 1, wherein the first usage condition includes a condition regarding a state of the imaging apparatus.

8. The imaging apparatus according to claim 7, wherein the first usage condition includes a condition regarding information obtained from an external device of the imaging apparatus.

9. The imaging apparatus according to claim 1, wherein the one or more processors is further configured to execute the instruction to:

set a second usage condition; and control a function of the imaging apparatus depending on whether or not the second usage condition is satisfied.

10. The imaging apparatus according to claim 9, wherein a function of the imaging apparatus is restricted in a case where the second usage condition is not satisfied.

11. The imaging apparatus according to claim 10, wherein the one or more processors is further configured to execute the instruction to:

change the first usage condition based on an input from an external device of the imaging apparatus.

12. An information processing method comprising:

obtaining authentication information;

specifying a user of an imaging apparatus based on the authentication information;

setting a first usage condition of the imaging apparatus; and performing control such that, in a case where the imaging apparatus performs imaging in a state where a user is specified, an imaged image obtained by the imaging and information on the user are recorded in association with each other, and performing control such that, in a case where the imaging apparatus performs imaging in a state where a user is not specified and in a state where the first usage condition is satisfied, the imaged image obtained by the imaging and information on a user corresponding to the first usage condition are recorded in association with each other, wherein the first usage condition includes a condition regarding a position of the imaging apparatus, a time at which the imaging apparatus performs imaging, an imaging target of the imaging apparatus, or motion of the imaging apparatus.

13. A non-transitory computer-readable storage medium configured to store a computer program comprising instructions for executing following processes:

obtaining authentication information;

specifying a user of an imaging apparatus based on the authentication information;

setting a first usage condition of the imaging apparatus; and performing control such that, in a case where the imaging apparatus performs imaging in a state where a user is specified, an imaged image obtained by the imaging and information on the user are recorded in association with each other, and performing control such that, in a case where the imaging apparatus performs imaging in a state where a user is not specified and in a state where the first usage condition is satisfied, the imaged image obtained by the imaging and information on a user corresponding to the first usage condition are recorded in association with each other, wherein the first usage condition includes a condition regarding a position of the imaging apparatus, a time at which the imaging apparatus performs imaging, an imaging target of the imaging apparatus, or motion of the imaging apparatus.

* * * * *